United States Patent
Segal

[11] 3,880,546
[45] Apr. 29, 1975

[54] HOLE SAW ASSEMBLY

[76] Inventor: Fred Segal, 545 Fairhill Dr., Akron, Ohio 44313

[22] Filed: Mar. 13, 1974

[21] Appl. No.: 450,902

[52] U.S. Cl. .................. 408/204; 144/23; 408/703
[51] Int. Cl. ............................................. B23b 51/04
[58] Field of Search .......... 408/204, 193, 224, 225, 408/703; 144/20, 23; 403/348, 349

[56] References Cited
UNITED STATES PATENTS

| | | | |
|---|---|---|---|
| 2,779,361 | 1/1957 | Mckiff | 408/204 |
| 3,267,975 | 8/1966 | Enders | 144/23 X |
| 3,784,316 | 1/1974 | Bittern | 408/204 |

Primary Examiner—Andrew R. Juhasz
Assistant Examiner—Z. R. Bilinsky
Attorney, Agent, or Firm—Freeman & Taylor

[57] ABSTRACT

A hole saw assembly including an arbor which comprises a stem, a body, a pilot drill carried by the body, and spring-loaded connecting means adapted to engage appropriate complemental locking means in the base of the cup-shaped hole saw. The hole saw has appropriate arcuate apertures in its base and appropriate inclined ramps which will, upon insertion and twisting movement of the arbor relatively of the saw, permit the spring-loaded locking means to be engaged by the ramps and snapped into place so as to secure the saw to the arbor in secure flush position. A modified form of the invention is also disclosed in which the spring-loaded locking means include fixed T-shaped studs or pins and ball detent means which also engage the base of the saw.

7 Claims, 9 Drawing Figures 3,880,546

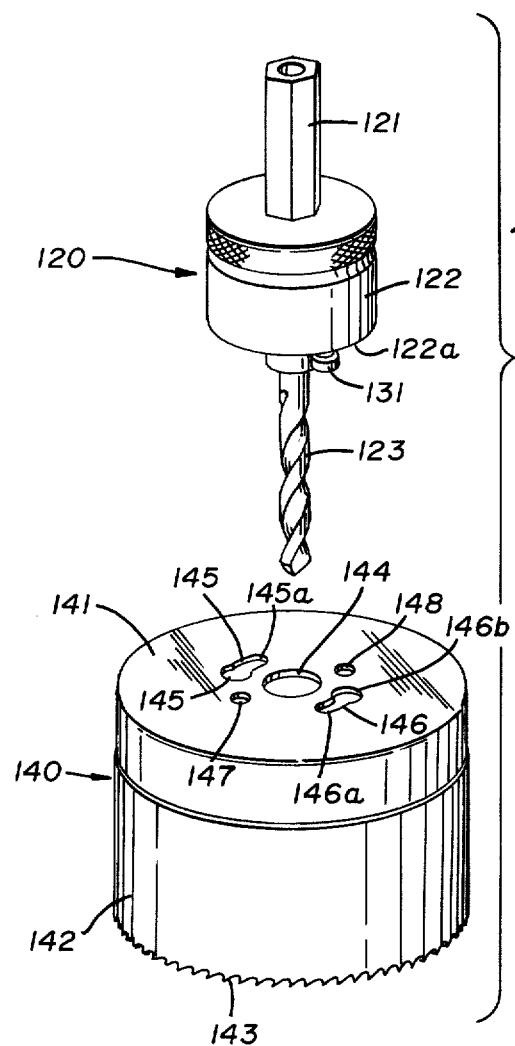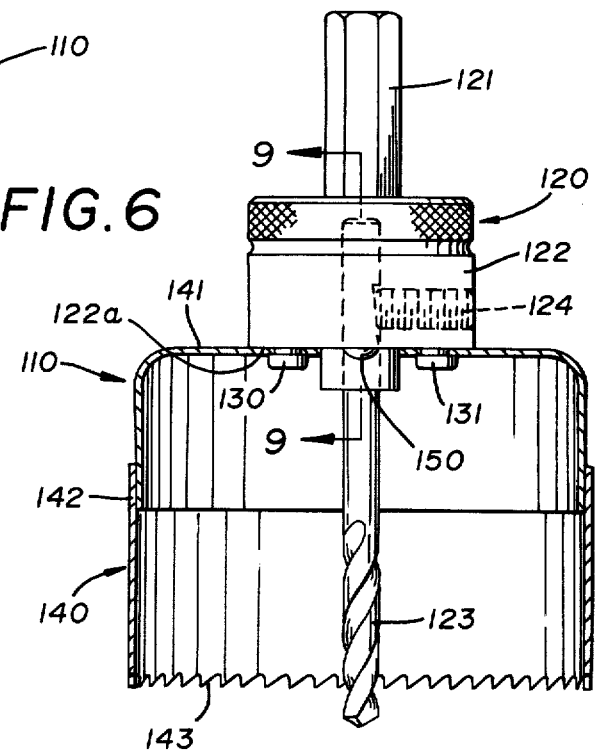
FIG. 6
FIG. 7
FIG. 9
FIG. 8

HOLE SAW ASSEMBLY

BACKGROUND OF THE INVENTION

This invention, in general, relates to hole saws and, in particular, relates to a unique assembly comprising an arbor having spring-loaded locking means and a cup-shaped hole saw having appropriate complemental locking means in its base to assure quick connect and disconnect between the arbor and the saw while insuring also that the arbor is drawn flush against the base of the saw.

DESCRIPTION OF THE PRIOR ART

There are a wide variety of high-speed steel hole saws and arbors on the market and known to Applicant. These saws and arbors generally are interconnected in one of two fashions. In one general form the connection is made by various threaded members carried by the arbor and the saw itself. In another form spring means are employed and T studs are engaged with keyholes in the base of the saw.

Examples of this prior art are shown in the following U.S. Pat. Nos. McKiff U.S. Pat. 2,779,361; Mueller et al U.S. Pat. 2,852,967; Stewart U.S. Pat. 3,138,183; Enders U.S. Pat. 3,267,975; Trevathan U.S. Pat. 3,390,596; Morse U.S. Pat. 3,647,310; Bittern U.S. Pat. 3,784,316;

While hole saw assemblies constructed along the lines described above and shown in the prior art patents listed above perform with varying degrees of efficiency, they all have certain deficiencies. For one thing, where the connection between the arbor and the saw is of the threaded type, it is extremely difficult to construct and machine a device so that the forward face of the arbor is flush with the bottom face or rear face of the saw. In this regard any space between these two faces leads directly to wobbling or chattering when the saw is actually in use. This problem becomes more difficult as the diameter of the saw increases.

Furthermore, most of the prior art devices are not capable of ready and quick connect and disconnect and require adjustment in an attempt to line up the studs, etc. It is also believed apparent that the cost of machining involved in tools of this nature is appreciable. These defects are believed to have been overcome by Applicant's invention disclosed herein.

SUMMARY OF THE INVENTION

It has been discovered that most of the difficulties listed above with regard to the existing prior art can be eliminated by providing, in one form of the invention, an arbor having a pair of opposed spring-loaded T-shaped studs or pins which are normally urged toward the forward face of the arbor. It has been discovered that if opposed arcuate slots or keyways with centrally enlarged openings are formed in the base of the saw and inclined ramps or cam ways are provided on both sides of the slots, the arbor can be quickly and easily connected to the saw by simply inserting the stud heads into the enlarged openings, following which relative rotation between the pieces, normally in a clockwise direction, will cause the heads of the studs to ride up the inclined ramps against the force of the springs. This will draw the forward face of the arbor and the bottom or rear face of the saw into flush engagement, thereby avoiding any problem of spacing between the two.

It has also been found that if the slots are made with the cam ways in opposed relationship on both sides of the enlarged openings, that in the event the saw becomes stuck or jammed in the cut, it is possible to reverse the arbor to the opposite hand relation and then reverse the rotation of the arbor and the drill to back the saw out of the cut.

In a modified form of the invention it has also been discovered that by utilizing fixed T-shaped studs which engage appropriate key slots in the base of the saw and providing spring-loaded detents on the face of the arbor to engage appropriate apertures in the base of the saw, that similar advantages can be achieved. In this way also quick connect and disconnect can be achieved while the necessity of accurately aligning the two pieces up is obviated, with the ball detents locating the same in secure relationship to each other.

Accordingly production of an improved hole saw assembly of the character described above becomes the principal object of this invention, with other objects thereof becoming more apparent upon a reading of the following brief specification and claims, considered and interpreted in view of the accompanying drawings.

Of The Drawings:

FIG. 6 is an exploded perspective view of the modified form of the assembly.

FIG. 7 is a vertical elevation of the form of the invention shown in FIG. 6 partially broken away in section.

FIG. 8 is a top plan view of the assembled form of the invention shown in FIG. 6.

FIG. 9 is a sectional view taken along line 9—9 of FIG. 7 showing the ball detents of the modified form of the invention.

BRIEF DESCRIPTION OF THE PREFERRED EMBODIMENTS

Figure 1:
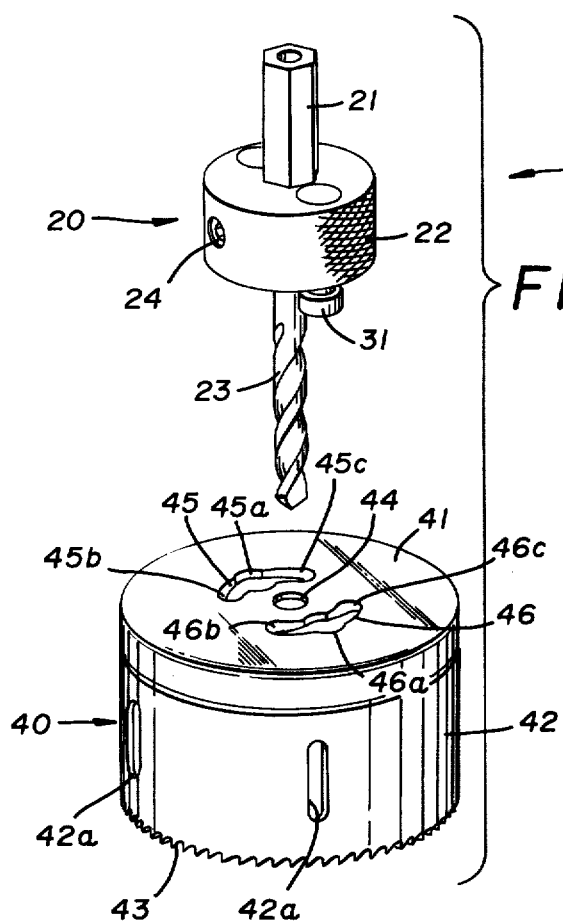
FIG. 1 is an exploded perspective view of the improved hole saw assembly.

Referring first then to FIG. 1, it will be noted that the overall hole saw assembly, generally indicated by the numeral 10, consists primarily of an arbor 20 and a hole saw 40.

Arbor 20 has the usual stem 21 intended to be received in the chuck of a drill or other driving device (not shown). The arbor also includes a body 22 and a pilot drill 23 which is releasably secured within the body 22 by the set screw 24 in known fashion.

Figure 2:
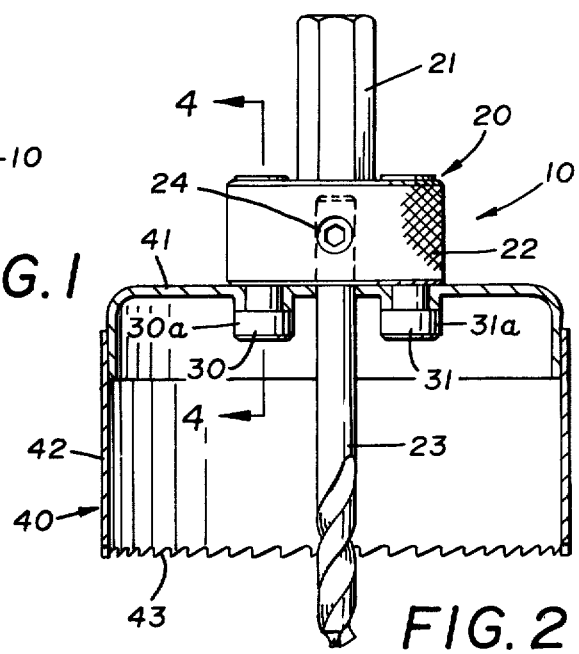
FIG. 2 is an elevational view partially broken away in section.
Figure 4:
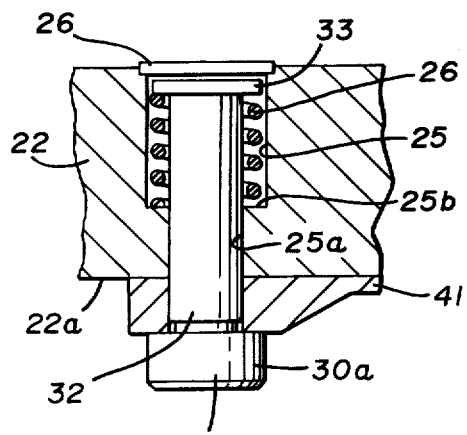
FIG. 4 is a sectional view taken along the line 4—4 of FIG. 2 showing the spring-loaded stud.

Referring to FIGS. 1, 2, and 4, it will be noted that the arbor also includes a pair of opposed T-shaped studs 30 and 31. FIG. 4 shows the detailed assembly of study 30, with it being understood that stud 31 is identical and is mounted in the body 22 of the arbor 20 in identical fashion 180°from stud 30.

In this regard and referring to FIG. 4, the body 22 of the arbor 20 has a bore and counterbore 25 and 25a extending from its rear to its forward face. Inserted within the counterbore 25 is a spring 26 which is spaced in encircling relationship to the shank 32 of the stud 30. Stud 30 has an enlarged head 30a on one end and another enlarged head 32 on the other so that the spring 26 is captured between the head 33 and the shoulder 25b of the counterbore 25. A cap 26 may be placed over the bore on the rear face of arbor body 22, and in this fashion the stud 30 is securely held in the body 22 of the arbor and is normally urged toward the forward face 22a of the arbor body. As noted above, the stud 31 is, of course, assembled in exactly the same fashion 180° removed from the pin 30.

Considering next then FIGS. 1 and 2 for a more specific description of the saw, it will be noted that the hole saw 40 is a generally cylindrical cup-shaped member having a base 41, an elongate cylindrical body 42, and cutting teeth 43. The side walls of the body 42 have appropriate chip-relieving apertures 42a, 42a provided therein in conventional fashion.

Figure 3:
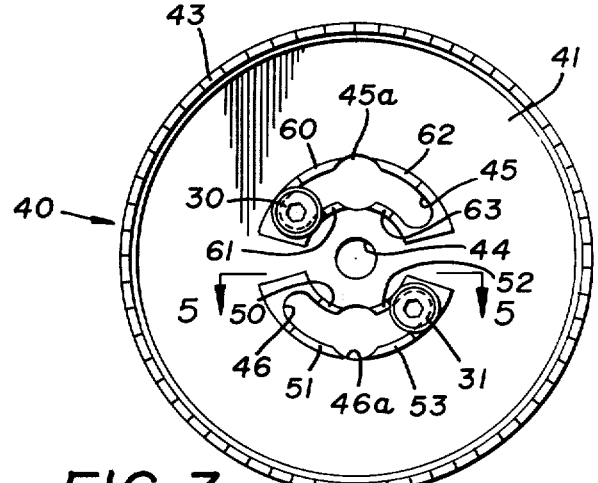
FIG. 3 is a top plan view of the assembled assembly.

The base 41 of the hole saw 40 is best illustrated in FIGS. 1 and 3. In this regard it will be noted that a central aperture 44 is provided through which the pilot drill is freely passed, as shown clearly in FIG. 2 of the drawings.

A pair of opposed arcuate slots 45 and 46 are disposed on opposite sides of the center bore 44, and these slots both have an enlarged central area 45a, 46a which is of sufficient size to readily receive the head 30a of stud 30 and the head 31a of stud 31.

On both sides of the enlarged openings 45a, 46a are reduced-width arcuate slots having a width smaller than the diameter of the enlarged heads 30a and 31a of the studs but being of sufficient size to freely receive the shanks of the studs.

Figure 5:
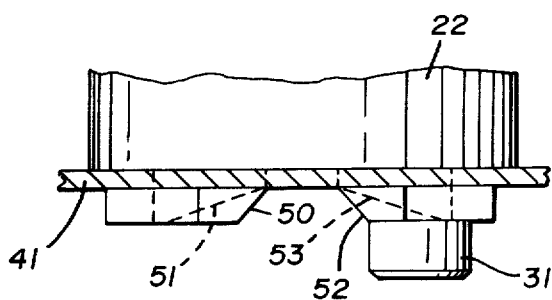
FIG. 5 is a sectional view taken along the line 5—5 of FIG. 3 and showing the ramp structure.

Referring to FIGS. 3 and 5, it will be noted that running along the edges of these slots 45b, 45c and 46b, 46c are inclined ramps which serve as cam ways. In the case of the slot 45, these ramps are identified by the numerals 60, 61, 62, and 63, and in the case of the slot 46 they are identified by numerals 50, 51, 52, and 53.

In assembly and use of the form of the invention shown in FIGS. 1 through 5, it is merely necessary to first assemble the arbor to the condition shown in FIG. 1, for example, by positioning the desired pilot drill 23 in place and tightening the same with set screw 34. It is then merely necessary to insert the heads of the studs 30 and 31 into the enlarged openings 45a, 46a while simultaneously inserting the pilot drill 23 through the opening 44. Following this a twisting motion in either direction will cause the heads of the studs 30 and 31 to slide up the cam surfaces 60, 61, 52, 53 or 62, 63 and 51, 50 against the force of the springs.

In this regard the device would normally be engaged with a clockwise twist since that is the normal direction of rotation of the drill. On the other hand, however, as noted above, in the event the saw should become jammed in the cut, it is possible to reverse this twist and then reverse the direction of the saw in order to pull the saw out of the cut.

It will be noted that because of the cooperation between the heads of the studs 30 and 31 and the cam surfaces, the movement of the heads up the cam surfaces will pull the forward face 22a of the arbor into flush relationship with the bottom 41 of the saw thereby eliminating the difficulties set forth above with regard to chatter or wobbling. A minimum of machining is necessary, and yet a very secure flush engagement between the arbor and the saw is achieved.

Once the device has been assembled as described, and assuming that the arbor has been engaged by the chuck of the driving means, the driving means can be actuated and the studs will also serve to drive the saw.

Referring to FIGS. 6 through 9, a modified form of the invention is illustrated.

It will be noted that the modified assembly, generally indicated by the numeral 110, again includes an arbor 120 and a hole saw 140.

The arbor 120 includes a stem 121, a body 122, and a pilot drill 123 which is held in place by set screw 124 as described above.

In this form of the invention a pair of fixed T-shaped studs 130 and 131 are employed as well as a pair of opposed ball detents 150, 151. The detent 150 is received within a bore 125 which is bored into the forward face of the arbor and is urged away from that face by the force of spring 126. Again only one of the detents has been illustrated in detail in FIG. 9, with it being understood that the remaining detent 151 would be of identical configuration and construction although spaced 180°from detent 150.

The saw 140 of this form of the invention again includes a base 141, side wall 142, and cutting teeth 143.

In the base 141 a central aperture 144 is again provided for reception of the pilot drill 123. Opposed key slots 145 and 146 are provided, and each of them has an enlarged portion 145b, 146b of sufficient size to receive the heads of the studs 130, 131. They also have extending therefrom reduced size slots 145a, 146a which are smaller than the diameter of the heads of the studs but large enough to receive the shanks thereof.

Also in opposed relationship to each other are a pair of circular apertures 147, 148 which are intended to engage the detents as will now be described.

Accordingly and referring to FIGS. 7, 8, and 9 of the drawings, it will be noted that in this form of the invention again it is merely necessary to insert the pilot drill 123 through aperture 144 and the heads of the studs 130 and 131 through the enlarged portions 145b, 146b of the slots 145, 146. Following this, rotation of the arbor and the saw relatively of each other in a clockwise direction will bring the detents 150 and 151 into engagement with the holes 147 and 148, thereby assuring that the face 122a of the arbor is snugly drawn against the face of the base 141 of the saw and again eliminating any possibility of a gap or space between these two faces.

Accordingly, again, in this form of the invention it is believed apparent that a very simplified machining operation is necessary, and yet quick connect and disconnect can be achieved while insuring tight contact between the arbor and the saw itself.

It has accordingly been shown how a greatly simplified and yet greatly improved hole saw assembly can be employed utilizing spring-loaded retaining means to interconnect the arbor and the saw so that the members are in flush abutment. No undue or unnecessary adjustment is required; therefore, not only is the assembly much more economical to manufacture, but it is much easier to use.

While a full and complete description of the invention has been set forth in accordance with the dictates of the Patent Satutes, it should be understood that modifications can be resorted to without departing from the spirit hereof or the scope of the appended claims.

In this regard it should be noted that in the form of the invention shown in FIGS. 1 through 5, while oppositely disposed camming surfaces have been disclosed with regard to the slots 45 and 46, this feature is not absolutely necessary since, as noted above, the normal direction of rotation would be clockwise, and therefore it would only be necessary to provide the inclined surfaces 60, 61 and 52, 53.

Furthermore, it should be noted that while two T-shaped studs have been illustrated and discussed in connection with the invention, it is possible with larger diameter saws to increase the number of studs for increased driving force which is necessary with the larger saw. In this regard three, four, or even more such studs could be utilized, and of course, the operation of the assembly would be identical to that described above.

Furthermore, it is also possible to increase the holding power and driving power of these studs by increasing the tension of the spring if desired. Accordingly, no specific spring tension has been set forth.

What is claimed is:

1. A hole saw assembly, comprising:
    A. an arbor having a forward planar face;
    B. a cylindrical cutting member having
        1. a base with a rearwardly presented planar face
        2. a cylindrical body and
        3. cutting teeth on the forward edge of said body;
    C. locking and driving means
        1. including at least two T-shaped studs carried by said arbor and adapted to engage said base of said cutting member; and
    D. resilient means normally urging said locking and driving means toward said forward planar face of said arbor
        1. whereby said arbor and said cutting member are interconnected with said forward planar face of said arbor in flush engagement with said rearwardly presented planar face of said cutting member.

2. The assembly of claim 1 wherein
    A. said base of said cutting member has at least two opposed locking slots formed therein;
    B. said T-shaped studs being adapted to engage said slots and draw said rearwardly presented face of said cutting member into engagement with said forward planar face of said arbor.

3. The assembly of claim 2 further characterized by the presence of inclined camming ramps disposed along the edges of said slots and adapted to engage the heads of said T-shaped studs whereby said arbor will be drawn toward said cutting member upon movement of said studs along said inclined camming ramps.

4. The assembly of claim 3 wherein each of said locking slots have a locally enlarged area for reception of the heads of said T-shaped studs; the remaining length of said slots having a width dimension that is less than the diameter of the heads of said T-shaped studs.

5. The assembly of claim 4 wherein said slots extend on both sides of said enlarged areas; said camming ramps being disposed along the extended areas.

6. A hole saw assembly, comprising:
    A. an arbor having a forward planar face;
    B. a cylindrical cutting member having
        1. a base with a rearwardly presented planar face
        2. a cylindrical body and
        3. cutting teeth on the forward edge of said body;
    C. spring-loaded locking and driving means
        1. carried by said arbor and adpated to engage said base of said cutting member
            a. whereby said arbor and said cutting member are interconnected with said forward planar face of said arbor in flush engagement with said rearwardly presented planar face of said cutting member; and
    D. said locking and driving means including
        1. at least two fixed, oppositely disposed T-shaped studs projecting from the forward face of said arbor
        2. at least two opposed spring-loaded ball of said arbor
        3. said studs and said detents adapted to engage said base of said cutting member.

7. The assembly of claim 6 wherein said base of said cutting member has
    A. at least two oppositely disposed slots each having an enlarged area capable of receiving the heads of said T-shaped studs; and
    B. at least two oppositely disposed apertures adapted to engage said detents.

* * * * *